United States Patent [19]
Holloway et al.

[11] 3,918,943
[45] Nov. 11, 1975

[54] PARTICULATE LEAD TRAP SYSTEM

[75] Inventors: John G. Holloway, Freeport; Herbert W. Barch, Natrona Heights, both of Pa.; Martin B. Treuhaft; Charles D. Wood, III, both of San Antonio, Tex.

[73] Assignee: PPG Industries, Inc., Pittsburgh, Pa.

[22] Filed: Sept. 28, 1973

[21] Appl. No.: 401,752

Related U.S. Application Data

[63] Continuation of Ser. No. 192,889, Oct. 27, 1971, abandoned.

[52] U.S. Cl. ............... 55/337; 55/524; 55/527; 55/DIG. 30; 60/311
[51] Int. Cl.² ................................. B01D 50/00
[58] Field of Search ........... 55/97, DIG. 30, DIG. 28, 55/DIG. 25, 337, 276, 330, 457, 459, 418, 510, 498, 500, 521, 527, 524, 429, 315; 23/288 F; 60/272, 273, 274, 311; 181/33 R, 33 C, 33 G, 35 R, 35 B, 35 C, 36 C, 36 B, 42

[56] References Cited
UNITED STATES PATENTS

| | | | |
|---|---|---|---|
| 2,596,936 | 5/1952 | Nielsen et al. | 260/30.6 |
| 2,731,102 | 1/1956 | James | 55/330 X |
| 3,129,078 | 4/1964 | Hobbs | 55/515 X |
| 3,132,473 | 5/1964 | Hass | 23/288 F X |
| 3,189,563 | 6/1965 | Hauel | 252/460 |
| 3,224,171 | 12/1965 | Bowman | 55/274 |
| 3,382,650 | 5/1968 | Peteri | 55/97 |
| 3,397,034 | 8/1968 | Tulleners et al. | 60/301 UX |
| 3,473,323 | 10/1969 | Briggs et al. | 23/288 F X |
| 3,499,269 | 3/1970 | Bois | 55/309 |
| 3,502,171 | 3/1970 | Cowan | 181/42 X |
| 3,552,103 | 1/1971 | Smith | 55/486 |
| 3,594,993 | 7/1971 | Heyse | 162/156 X |
| 3,633,343 | 1/1972 | Mark | 55/316 |
| 3,650,095 | 3/1972 | Welch et al. | 55/521 X |
| 3,712,029 | 1/1973 | Charlton | 55/100 |
| 3,738,089 | 6/1973 | Brill | 55/310 |

FOREIGN PATENTS OR APPLICATIONS

| | | | |
|---|---|---|---|
| 1,346,008 | 11/1963 | France | 55/337 |
| 1,349,759 | 12/1963 | France | 55/337 |

OTHER PUBLICATIONS

"The Amazing Story of the Absolute Filter," Bulletin 104, Cambridge Filter Corporation, Syracuse, New York 13201, copyright 1963.

*Primary Examiner*—Bernard Nozick
*Attorney, Agent, or Firm*—John E. Curley; Robert DeMajistre

[57] ABSTRACT

An improved method and apparatus for treating automotive exhaust gases is described which involves passing the exhaust gases from the engine exhaust manifold through an inertial particulate separator for primary treatment for the removal of particulates followed by the subsequent passage of the gases through a specially constructed fiber glass filter containing a fiber glass filter paper or mat for the removal of the remainder of particulates. The gases during their passage from the exhaust manifold of the engine to the inertial particulate separator are reduced in temperature substantially to provide gas temperatures entering the fiber glass filter elements of 500°F. or less.

2 Claims, 3 Drawing Figures

EXHAUST IN

INVENTOR

ATTORNEY

PARTICULATE LEAD TRAP SYSTEM

This is a continuation of application Ser. No. 192,889, filed Oct. 27, 1971, now abandoned.

BACKGROUND OF THE INVENTION

Considerable concern has been expressed by federal and state governments as well as by industry in recent years in solving the problems of atmospheric pollution caused by the exhaust gas emissions of internal combustion engines, and in particular the emissions caused by automotive exhaust gases. These emissions, on a volume basis are primarily gases such as oxides of carbon, nitrogen and unburned hydrocarbons. In addition the use of leaded fuel contributes lead particulates to the automotive exhaust gases. The presence of these particulates in automotive exhaust gases has also become a matter of concern to both industry and government. The concern of government appears to center around the question of whether or not these particulate lead emissions represent a health hazard; a question still somewhat unresolved. Concern of industry over these particulates centers on their effect on catalytic muffler systems designed to reduce gaseous emissions such as hydrocarbons, carbon monoxide and nitrogen oxides. One obvious solution to the problem of lead particulate emissions is the removal of lead from gasoline. This has already resulted in legislation on state and federal levels limiting the quantities of lead in gasoline. Because of the unique nature of lead in gasoline and its beneficial properties in increasing gasoline in octane value, its removal necessitates further refining of normal gasoline stocks to produce gasolines with low lead that have adequate octane ratings for automotive use. The further processing of gasoline to compensate for the loss of lead tends to increase the price of gasoline and also results in the depletion of petroleum feed stocks, neither of these being desirable. Thus, an effective method of permitting leaded gasoline to continue to be used while eliminating lead particulate emissions is desirable so that low cost, high octane gasolines can still be used in automotive systems. Such a method will benefit the petroleum industry in that fuel reserves will not be reduced by producing super refined gasolines needed to supply fuels having the current high octane values of leaded fuels. Further, in using unleaded, low octane, gasoline the compression ratio of the engines must be reduced thereby reducing the thermal efficiency of the engine which results in increased fuel consumption.

THE PRESENT INVENTION

In accordance with the present invention, a method of treating exhaust gases and apparatus for this purpose have been provided which effectively remove particulates and lead in particular from the exhaust gases of an internal combustion engine and automobile exhaust gases in particular. The method of the instant invention involves passing the exhaust gases at high temperature from the exhaust manifold of an engine through an exhaust pipe, the design of which can be modified to provide considerable heat transfer from the gases during their passage along the exhaust pipe system to an inertial particulate separator located preferably in the rear portion of the automobile. The inertial particulate separator may take any convenient shape. In the preferred embodiment of the instant invention, a cyclone separator is used as will be hereinafter more fully described. The gases entering the cyclone particulate separator have large particulates of lead removed therefrom. The cyclone is designed generally to remove particles greater than 2 microns in size from the gases passing thereto. Typically at least 75 percent or more of the particles greater than 2 microns are removed in the cyclone. The gases after passage through the inertial particulate separator then pass through a fiber glass filter element specially constructed to provide an absolute filtering of the particulate materials passing through the fiber glass mat or paper forming the filter element of the fiber glass filtering system. By absolute filter is meant the filter which will filter out 99.97 percent of material in a size range of 0.3 micron or greater.

The invention will be more readily understood with reference to the accompanying drawings in which.

Figure 1:
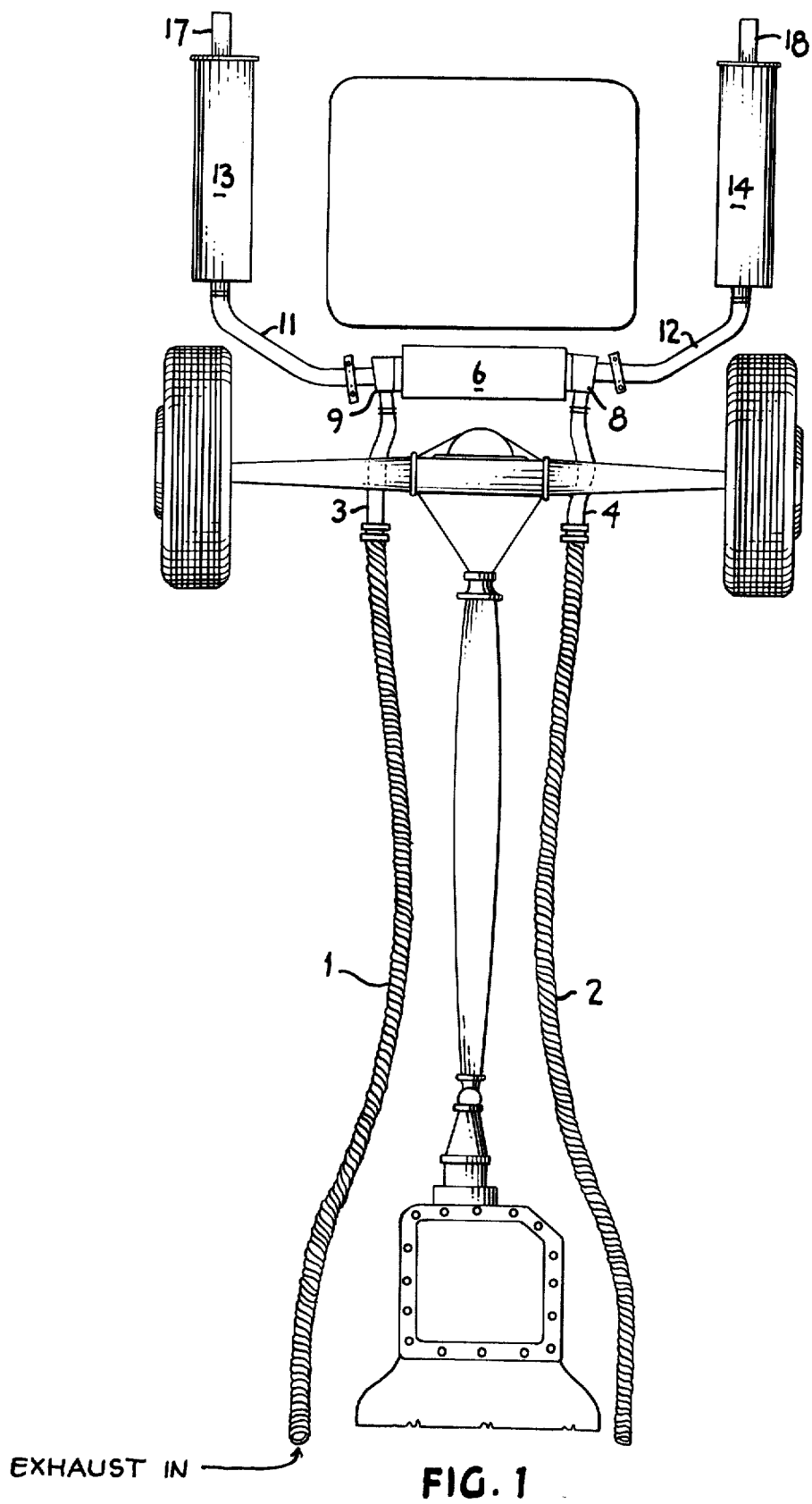
FIG. 1 is a plan view of the bottom of an automobile showing the exhaust pipe, inertial particulate separator and filters associated with the automobile.

Turning to the drawings, FIG. 1, in particular, the exhaust gas particulate lead trap system shown, involves two exhaust pipes 1 and 2 which are appropriately connected to the exhaust manifold of the automobile engine (not shown). Exhaust pipes 1 and 2 are shown as fluted pipes for ease in transferring heat from the interior of the exhaust pipes 1 and 2 to the atmosphere during automotive operation. Exhaust pipes 1 and 2 are connected to two intake lines 3 and 4 which are connected to inertial particulate separator device 6 at inlets 9 and 8, respectively. Two effluent conduits or pipes 11 and 12 are shown which remove gaseous materials entering inertial particulate separator 6 and pass them to the fiber glass filtering devices 13 and 14, respectively. Device 13 is provided with an exit exhaust conduit 17 and device 14 is provided with a similar exhaust pipe or exit conduit 18.

Figure 2:
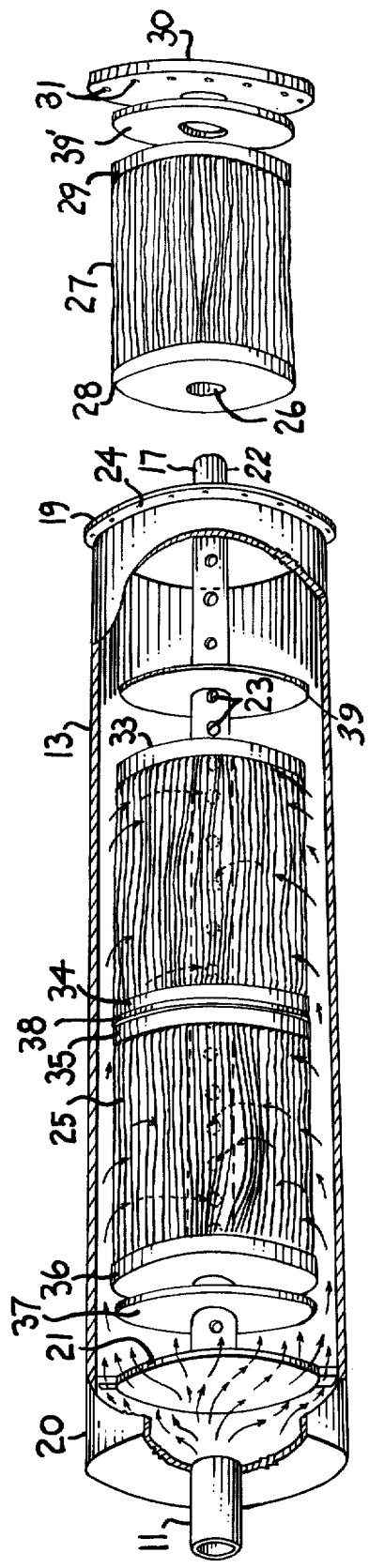
FIG. 2 is a perspective view of a fiber glass filter element with the sides broken away to show the internal circulation of the gases.

Turning to FIG. 2, the filtering element 13 is shown in more detail to provide an understanding of internal circulation of the gases entering device 13 from element 11. It will be understood that the filtering device 14 is identical in construction to the filter device 13 and operates in similar fashion when gases are passed through conduit 12 to the interior of element 14. For convenience therefore the filter elements 13 and 14 will be discussed with reference to filter 13 shown in FIG. 2.

As shown in FIG. 2, filter element 13 is constructed of a housing 20 which has positioned in it an end plate 21 at the feed inlet end of housing 20. End plate 21 conveniently has welded to it or formed as an integral part thereof a filter support tube 22 which is constructed and arranged such that it traverses substantially the entire length of the housing 20 and is provided with a plurality of orifices or holes 23 along its long axis. While a single set of holes are shown in the drawing, similar holes are provided at several locations along the long axis of the support tube 22 for the distribution of gases. Positioned on the support tube 22 is shown a plurality of tubular fiber glass filter elements 25 which have a central opening 26 constructed and arranged to fit snuggly around the support member 22. The filter element is composed of convoluted fiber glass paper 27 which is held in place at either end by end caps 28, 29, 33, 34, 35 and 36. End plate 30 is provided at the exit end 17 of the filter element 13. The plate 30 is provided with a plurality of drilled apertures 31 which correspond to the drilled apertures 24 on the end of the plate element 19 of the filter 13. These holes provide for the insertion of suitable bolts and nuts to firmly attach the end plate 31 to the end of the filter element 13 and provide a gas tight seal in this portion of the filter device. A plurality of fiber glass paper seals 37, 38, 39 and 39' are provided between the units 25 that abut each other and between the units 25 and plates 21 and 30.

Figure 3:
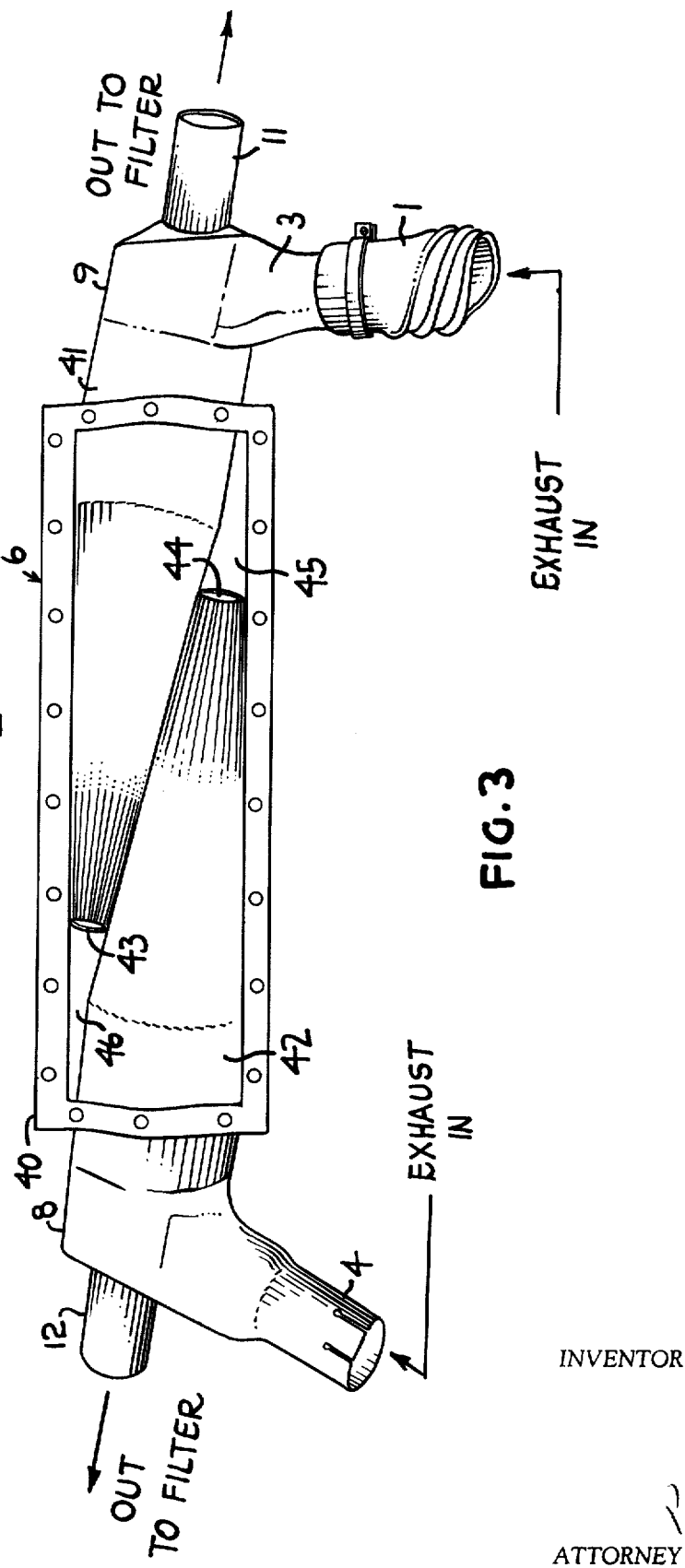
FIG. 3 is a perspective view of a cyclone inertial particulate separator with the top removed to show the internal positioning of the cyclones.

Turning to FIG. 3 the inertial particulate separating device generally indicated at 6 is constructed of a housing member 40 in which are located two inertial cyclone units 41 and 42. Cyclone 42 has a gas inlet section 8. Cyclone 41 has a gas inlet section 9 associated therewith. Inlet 8 is connected to exhaust conduit 4 and inlet 9 is connected to exhaust conduit 3 of exhaust pipes 1 and 2, respectively. The gases pass into the cyclone unit and have imparted to them a circular motion as they travel down the coneshaped portion of the respective cyclones. Due to the impartation of the centrifugal motion to the gases large particulates leave the gas stream and are removed from cyclone 41 at point 43 and from cyclone 42 at point 44. The particulates are deposited in chambers 45 and 46, respectively. The gases pass out of the cyclone 42 through conduit 12 and from cyclone 41 via conduit 11. Conduits 11 and 12 as previously mentioned are connected to filter units 13 and 14, respectively.

Fiber glass mat or paper 27 is formed by slurrying chopped or discontinuous fiber glass fibers or strands and forming a continuous mat of fiber glass on a conventional paper making machine. The fibers may be drawn or flame attenuated. After formation of the mat the fiber glass mat is capable of operating at temperatures as high as 600°F. The bonding material must be such that it can withstand temperatures on this order and preferably when cured on the fiber glass operates in a temperature range of 500°F. to 600°F.

A particularly acceptable binder for this purpose is a benzophenone dianhydride-metaphenylene diamine reaction product in a solvent of ethanol-N-methyl-2-pyrrolidone on a 30 to 70 percent volume basis ethanol to N-methyl pyrol. Other solvents for the reaction product used may be dimethylacetamide, dimethylforamamide, dimethylsulfoxide and pyridine. In lieu of metaphenylenediamine other aromatic diamines such as 4,4-diaminophenyl ether may be used.

In applying the binder to the fiber glass the reaction product of the dianhydride-diamine in its carrier solvent is made water soluble by adding it to or adding to it, water containing a member of the group consisting of alkali metal hydroxides and ammonium hydroxide. Typical alkali metal hydroxides are sodium, potassium and lithium hydroxide. Ammonium hydroxide is preferred. Thus, in the preferred embodiment a benzophenone dianhydride-metaphenylene diamine reaction product in ethanol-N-methyl-2-pyrrolidone solvent is added to an aqueous ammonium hydroxide solution. Typically on a weight basis the solution is about 1 percent ammonium hydroxide and the dianhydride-diamine with its solvent media is about 8 percent.

The fiber glass fibers are slurried and vacuum drawn on conventional paper making equipment to form the fiber glass paper. After drying, the fiber glass paper is dipped in the aqueous solution containing the high temperature polyimide prepolymer binder and subsequently dried. The fiber glass paper is normally folded in the desired shape prior to application of the binder.

Thus, in the preferred preparation, the fiber glass paper to be used in the filter element is folded in the shape shown in the drawing and dipped in the ammoniacal water solution containing the dianhydride-diamine reaction product. After thorough wetting the paper is dried, typically in an oven at about 300°F. for 1 hour. The fiber glass filter paper is then cured at 600°F. for about 4 hours to form a strongly adherent polyimide binder on the fiber glass in the paper. While it is preferred to operate the process of applying binder from an aqueous solution, this is not a critical feature of application since the organic solvents in which the dianhydride-diamine reaction product are present may also be used as the vehicle to apply the binder to the fiber glass. Water solutions are preferred because of the ease of handling, the ability to uniformly apply the binder and the safety involved in its use over solvents which may be noxious or flammable.

In a specific application a benzophenone dianhydride-phenylene diamine, Skybond 700 sold by Monsanto was prepared for binding fiber glass paper by forming a batch containing 891.18 grams of $H_2O$, 7.47 grams of Skybond and 1.35 grams of ammonium hydroxide. The fiber glass paper was folded in the desired shape and dipped in a bath containing these ingredients in these proportions and air dried for 1 hour at 300°F. The paper was then oven cured at 600°F. for 4 hours. The fiber glass papers were formed in the configuration shown in FIG. 2 and were bound at each end by metal caps 28, 29, 33, 34, 35 and 36.

Three cylinders prepared in this manner were assembled on the spindle support member 22 of FIG. 2 of the accompanying drawing. The plate 31 was attached to the end plate 24 of the filter 13 and firmly seated with bolts and nuts and a gasket member to provide an airtight seal at this end of the device. Two filters assembled in this manner were connected to pipes 11 and 12 as shown in FIG. 1 which in turn were connected to a dual cyclone system having cyclones 41 and 42 associated therewith and connected at the inlet ends 8 and 9 of these cyclones through conduits 3 and 4 to exhaust pipes 1 and 2. Exhaust pipes 1 and 2 are connected to the exhaust manifold of an engine (not shown) and the unit was ready for operation. The automotile unit shown in FIG. 1 was driven on a 1970 four door Impala Chevrolet sedan for a distance of 9,000 miles. The operating conditions of the automobile during the test period were varied since the automobile was operated under normal driving conditions. Thus, the car operated at high speeds, low speeds and in-town traffic. After accumulating a total mileage on the car of 9,000 miles the filter units 13 and 14 were removed from the automobile and examined for stability and lead particulate trapping. Similarly the inertial separator 6 was disassembled and the gas spaces 45 and 46 examined for trapped lead. Based on the average lead content of the gasoline utilized during the test period and the total quantity of lead collected in both locations, it was estimated that the lead removal amounted to an efficiency in trapping lead of 97 percent.

The use of a fiber glass filter of the absolute type has thus resulted in the effective removal of all particulate lead above 0.3 micron in size as well as all particulates in this size range. These particulates are removed by impingement or interception of the particulates by the glass fibers. Particles below 0.3 micron are also removed by diffusion effect in the filter. Tests in which exhaust gas from pipes 17 and 18 are passed through subsequent absolute filters (i.e., filters designed to trap all particles 0.3 micron or larger) show the gases removed from filter units 13 and 14 to be lead free.

The filter units 13 and 14 are shown to have a particular configuration in FIG. 2. This is for convenience only. The important consideration is the utilization of a fiber glass filter paper which is composed essentially entirely of fiber glass and possesses a high temperature capability, i.e., it will withstand operating temperatures during filtering of 300°F. to 600°F., generally 400°F. to 500°F., without thermal degradation. On automotive tests, filter papers of fiber glass with the binders applied have accumulated up to 12,000 miles of driving without any degradation visible.

The filter is operated at 600°F. or less, typically 500°F. or less, to insure that lead particulates present will be in a state to be readily filtered.

Similarly, in the system shown cyclones have been employed for convenience. Other inertial separators such as baffled pipes may be used for this purpose if desired.

If desired an agglomerator can be used in the system shown in FIG. 1 and may take any convenient form. Typically where employed the agglomerator consists of a chamber filled with steel wool, fiber glass, inert particles of material such as silica, alumina, ceramic beads or saddles or any other similar material which will force the exhaust gases to follow a tortuous path on the way to the inertial separator. The agglomerator is typically placed between the engine exhaust gas manifold and the inertial separator so that the hot gases in these areas contact it prior to entering the inertial separator. The gases typically range in temperature from 1,000°F. to about 1,400°F. It is frequently found that the use of the agglomerator results in the collection of increased quantities of lead in the separator than in instances where one is not used.

In the specification and claims the terms "substantially lead free", "to remove substantially all particulates" mean that upon analysis for particulate content of a gas stream treated in accordance with this invention less than 0.1 percent particulate was found.

While the invention has been described with reference to certain specific illustrated embodiments and examples, it is of course not intended that it be so limited except insofar as appears in the accompanying claims.

We claim:

1. In a particulate filter system for automotive exhaust gases the combination comprising:
   a first exhaust gas conduit, one end thereof being in gas communication with an internal combustion engine;
   an inertial gas cyclone separator having an inlet and an outlet, the inlet thereof being in gas communication with the opposite end of said first exhaust gas conduit;
   a second exhaust conduit, one end thereof being in gas communication with the outlet of said inertial gas separator;
   a filter in gas communication with the opposite end of said second exhaust conduit, said filter being comprised of:
   a filter housing;
   an inlet means to said filter housing allowing the exhaust gases to be introduced into said filter housing;
   an outlet means allowing the gases introduced into said housing to be discarded for disposal;
   a pleated fiberglass paper filter interposed between said inlet and said outlet across the flow path in a manner that all gases passing from the inlet to the outlet must pass through said fiberglass paper filter; said fiberglass paper filter having thereon a polyimide binder capable of withstanding 500°F; said binder maintaining said fiberglass paper filter in paper form, and said fiberglass paper filter removing at least 99.97 percent of all particulates of 0.3 microns and greater in said exhaust gases which have entered said filter housing.

2. The particulate filter system of claim 1 wherein said exhaust pipe is a fluted exhaust pipe.

* * * * *